(12) United States Patent
Mattarocci

(10) Patent No.: US 9,376,037 B1
(45) Date of Patent: Jun. 28, 2016

(54) CAR SEAT

(71) Applicant: Baby Trend, Inc., Ontario, CA (US)

(72) Inventor: Bradley James Mattarocci, Rancho Cucamonga, CA (US)

(73) Assignee: Baby Trend, Inc., Ontario (CA)

( * ) Notice: Subject to any disclaimer, the term of this patent is extended or adjusted under 35 U.S.C. 154(b) by 22 days.

(21) Appl. No.: 14/327,433

(22) Filed: Jul. 9, 2014

Related U.S. Application Data

(60) Provisional application No. 61/844,166, filed on Jul. 9, 2013, provisional application No. 61/986,841, filed on Apr. 30, 2014.

(51) Int. Cl.
*B60N 2/26* (2006.01)
*B60N 3/10* (2006.01)
*B60N 2/44* (2006.01)
*B60N 2/28* (2006.01)

(52) U.S. Cl.
CPC .............. *B60N 2/265* (2013.01); *B60N 2/2806* (2013.01); *B60N 2/2821* (2013.01); *B60N 2/44* (2013.01); *B60N 3/101* (2013.01)

(58) Field of Classification Search
CPC .......... B60N 2/265; B60N 3/101; B60N 2/44; B60N 2/2821; B60N 2/286; B60N 2/2866; B60N 2/2806
See application file for complete search history.

(56) References Cited

U.S. PATENT DOCUMENTS

| | | | | |
|---|---|---|---|---|
| 4,040,664 A * | 8/1977 | Tanaka | ................. | B60N 2/2806 297/216.11 |
| 5,462,333 A * | 10/1995 | Beauvais | ............. | B60N 2/2821 297/216.11 |
| 5,964,502 A * | 10/1999 | Stephens | ............... | B60N 2/2812 297/250.1 |
| 6,471,298 B2 * | 10/2002 | Carine | .................. | B60N 2/2806 297/482 |
| 6,916,066 B2 * | 7/2005 | Sedlack | ................. | A47D 13/02 24/198 |
| 7,066,536 B2 * | 6/2006 | Williams | ............. | B60N 2/2851 16/266 |
| 7,131,692 B2 * | 11/2006 | Huang | ..................... | B60N 2/28 297/250.1 |
| 7,306,284 B2 * | 12/2007 | Horton | ................. | B60N 2/2812 297/250.1 |
| 7,331,633 B2 * | 2/2008 | Balensiefer | .......... | B60N 2/2866 297/250.1 |
| 7,360,830 B2 * | 4/2008 | Balensiefer | .......... | B60N 2/2866 297/188.08 |
| 7,475,941 B2 * | 1/2009 | Clement | ............. | B60N 2/2806 297/255 |
| 7,607,697 B2 * | 10/2009 | Esler | ....................... | B60R 22/28 24/579.09 |
| 7,637,568 B2 * | 12/2009 | Meeker | ................ | B60N 2/2806 297/230.14 |
| 7,669,926 B2 * | 3/2010 | Balensiefer | .......... | B60N 2/2851 297/250.1 |
| 7,748,788 B2 * | 7/2010 | Yumoto | ............... | B60N 2/2806 297/452.42 |
| 7,810,883 B2 * | 10/2010 | Berger | ................. | B60N 2/2851 297/256.1 |
| 7,901,003 B2 * | 3/2011 | Meeker | ................ | B60N 2/2806 297/250.1 |
| 8,096,613 B2 * | 1/2012 | Gibson | ................ | B60N 2/2851 297/250.1 |
| 8,500,196 B2 * | 8/2013 | Strong | ................. | B60N 2/2812 297/216.11 |
| 8,960,793 B2 * | 2/2015 | Gillett | .................. | B60N 2/2821 297/188.08 |
| 2006/0071535 A1* | 4/2006 | Kim | ....................... | A44B 11/04 297/465 |
| 2006/0279116 A1* | 12/2006 | Munn | ...................... | B60N 2/20 297/256.1 |
| 2007/0236061 A1* | 10/2007 | Meeker | .................... | B60N 2/20 297/250.1 |
| 2007/0246982 A1* | 10/2007 | Nett | ..................... | B60N 2/2851 297/250.1 |
| 2010/0052402 A1* | 3/2010 | Berger | ................ | B60N 2/2809 297/471 |
| 2012/0292965 A1* | 11/2012 | Sedlack | ................... | B60N 2/66 297/256.16 |
| 2012/0292977 A1* | 11/2012 | Sedlack | ................... | B60N 2/66 297/483 |
| 2014/0132045 A1* | 5/2014 | Brady | ..................... | B60R 7/043 297/188.11 |

* cited by examiner

*Primary Examiner* — Joshua J Michener
*Assistant Examiner* — Matthew Gitlin
(74) *Attorney, Agent, or Firm* — Faegre Baker Daniels LLP

(57) ABSTRACT

A car configured to support a child is provided that includes a seat bottom, a seat back, and a harness to secure a child in the car seat. The seat bottom and seat back are blow molded. The seat bottom includes a cup holder received within an aperture formed in the blow-molded seat bottom.

20 Claims, 22 Drawing Sheets

CAR SEAT

RELATED APPLICATIONS

This application claims priority to U.S. Provisional Patent Application Ser. No. 61/844,166, filed Jul. 9, 2013, titled "Car Seat" to Bradley James Mattarocci, and U.S. Provisional Patent Application Ser. No. 61/986,841, filed Apr. 30, 2014, titled "Car Seat" to Bradley James Mattarocci, the entire disclosures of which are expressly incorporated by reference herein.

FIELD

The present disclosure relates to generally to a car seat, and more particularly to a car seat having a seat bottom and a seat back.

BACKGROUND AND SUMMARY OF THE INVENTION

According to one aspect of the present disclosure, a car seat is provided that is configured to support a child in a vehicle. The car seat includes a blow-molded seat bottom, a blow-molded seat back removably coupled to the blow-molded seat bottom, and a harness including shoulder straps positioned to extend over the shoulders of a child positioned in the car seat and at least one strap joined to the shoulder straps and extending to the blow-molded seat bottom. The length of the shoulder straps is adjustable with the at least one strap.

According to another aspect of the present disclosure, a car seat is provided that is configured to support a child in a vehicle. The car seat includes a blow-molded seat bottom having an interior region, a seat back coupled to the seat bottom, and a cup holder positioned in the interior region of the blow-molded seat bottom.

According to another aspect of the present disclosure, a car seat is provided that is configured to support a child in a vehicle. The car seat includes a seat bottom, and a blow-molded seat back coupled to the seat bottom. The blow-molded seat back has channels defining a Y-shaped recess strengthening the blow-molded seat back.

According to another aspect of the present disclosure, a car seat is provided that is configured to support a child in a vehicle. The car seat includes a seat bottom, and a blow-molded seat back coupled to the seat bottom. The blow-molded seat back has a front side and back side that merge together to form a beam.

According to another aspect of the present disclosure, a car seat is provided that is configured to support a child in a vehicle. The car seat includes a seat bottom, a seat back coupled to the seat bottom, and a harness including shoulder straps positioned to extend over the shoulders of a child positioned in the car seat, at least one strap extending to the blow-molded seat bottom, and a pair of plates joining the at least one strap to the shoulder straps.

The above mentioned and other features of the invention, and the manner of attaining them, will become more apparent and the invention itself will be better understood by reference to the following description of embodiments of the invention taken in conjunction with the accompanying drawing.

BRIEF DESCRIPTION OF THE DRAWINGS

The above-mentioned and other features of the disclosure, and the manner of attaining them, will become more apparent and the disclosure itself will be better understood by reference to the following description taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

The embodiments disclosed herein are not intended to be exhaustive or to limit the disclosure to the precise forms disclosed in the following detailed description. Rather, the embodiments are chosen and described so that others skilled in the art may utilize their teachings.

Figure 1:
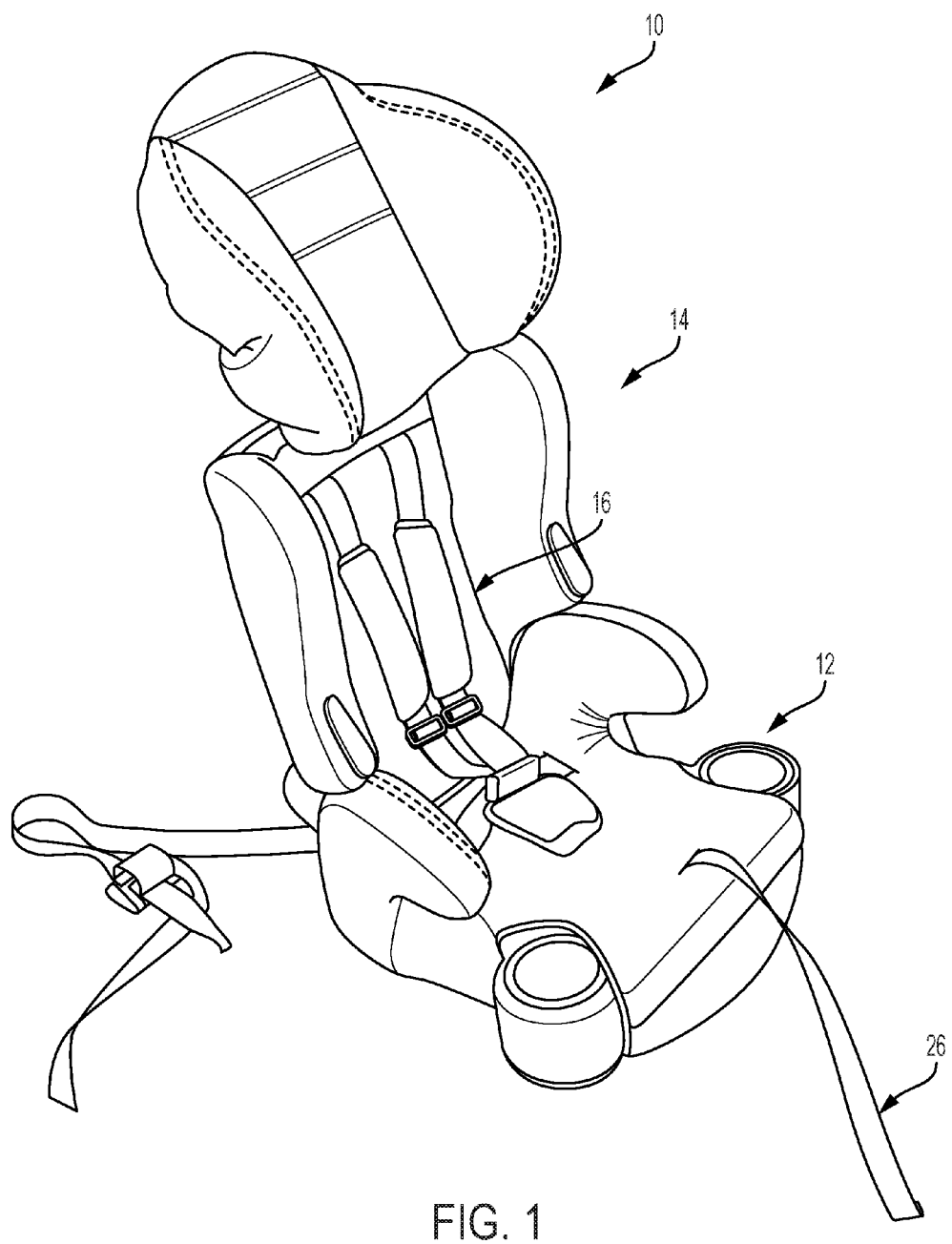
FIG. 1 is a front perspective view of a car seat including a seat bottom and a seat back covered by upholstery.
Figure 2:
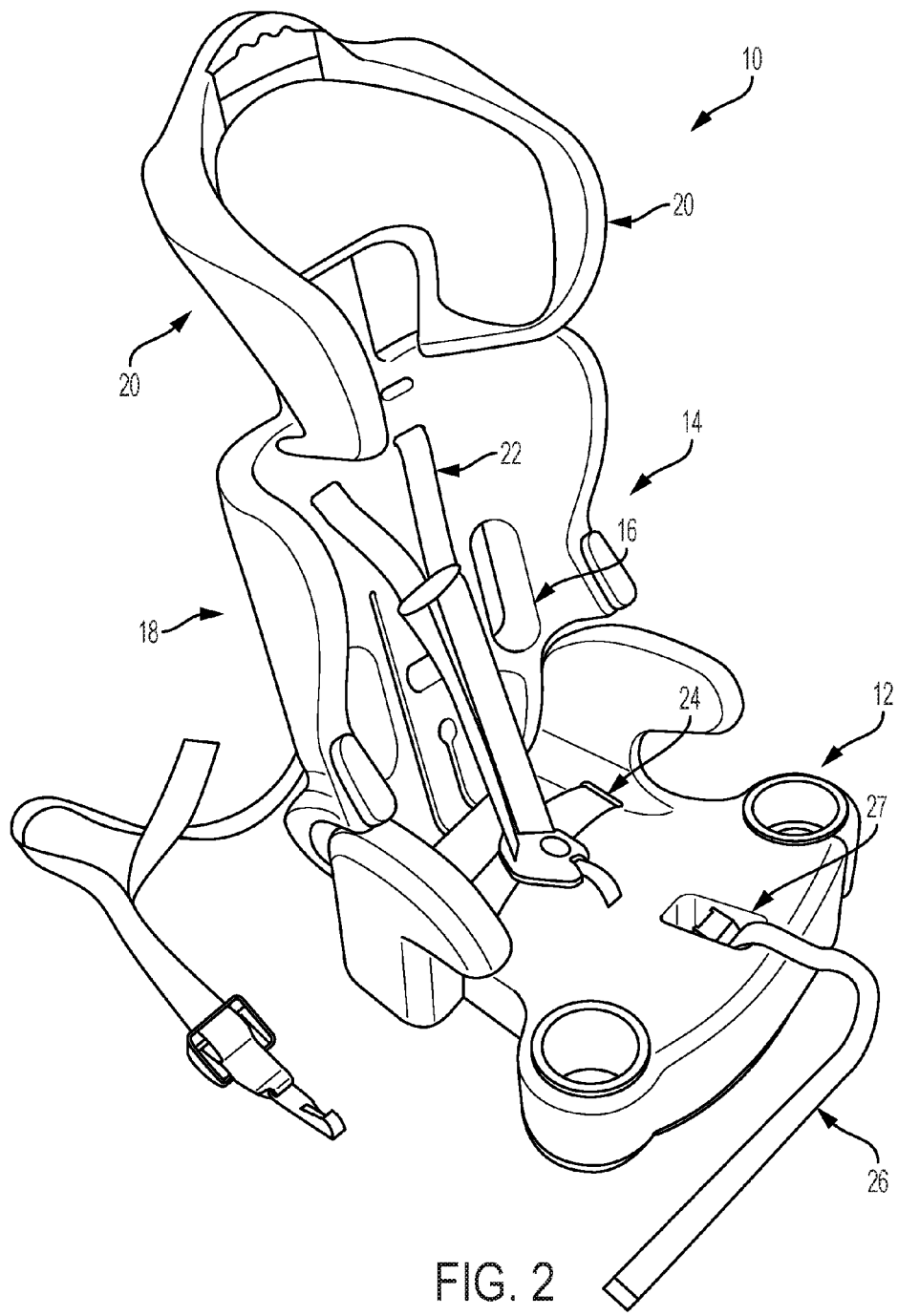
FIG. 2 is a view similar to FIG. 1 of the car seat of FIG. 1 showing the upholstery removed.
Figure 3:
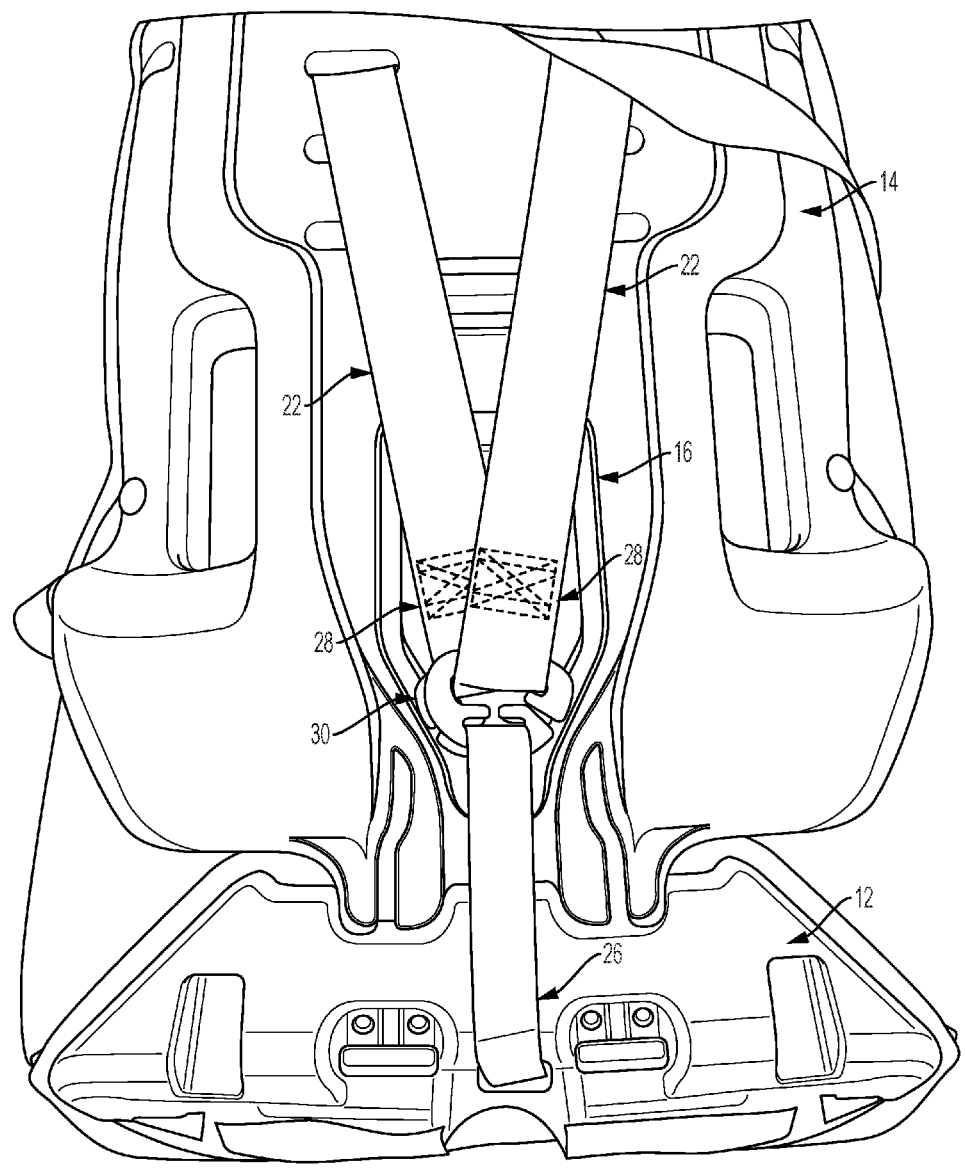
FIG. 3 is a rear view of the car seat of FIG. 1 showing the car seat including a pair of shoulder straps extending to the rear the car seat and coupled to respective plates that are coupled to a center strap.

FIG. 1 shows an exemplary car seat 10. According to the preferred embodiment of the present disclosure, car seat 10 includes a seat bottom 12, a removable seat back 14, and a removable harness 16. When seat bottom 12, seat back 14, and harness 16 are coupled together, car seat 10 functions as a harnessed booster seat. When harness 16 is removed, seat 10 functions as a high back booster seat. When seat back 14 is removed from seat bottom 12, seat bottom 12 functions as a low back booster seat.

Seat back 14 includes a main body 18 and a headrest 20 that can be adjusted upward and downward relative to the main body 18 to provide an adjustable headrest for a child sitting on car seat 10 when seat back 14 is coupled to seat bottom 14. Harness 16 includes a pair of shoulder straps 22 that extends through slots in main body 18 so that portions of shoulder straps 22 are positioned in front of main body 18 and behind main body 18, and portions extend through main body 18. Lower portions of shoulder straps 22 extend through a five point buckle 24 and coupled to seat bottom 12 so that the lower portions extend over a child's thighs. Five point buckle 24 is coupled to seat bottom 12 with a crotch strap. Harness 16 also includes a center strap 26 that is coupled to loops 28 on the rear ends of shoulder straps 22 by a pair of metal plates 30 and to a front of seat bottom 12. Seat bottom 12 includes a clamp 27 that permits adjustment of the length of center strap 26 that extends from plates 30 to the front of seat bottom 12. By adjusting this length, the amount shoulder straps 22 that is positioned in front of main body 12 of seat back 14 can also be adjusted for the size of the child and to permit the location of shoulder straps 22 to be repositioned in any one of the slots in main body 18. Additionally, by pulling on center strap 26, the adjustable length can be shortened and held in place by the clamp to remove unnecessary slack in center strap 26 and shoulder straps 22.

Figure 4:
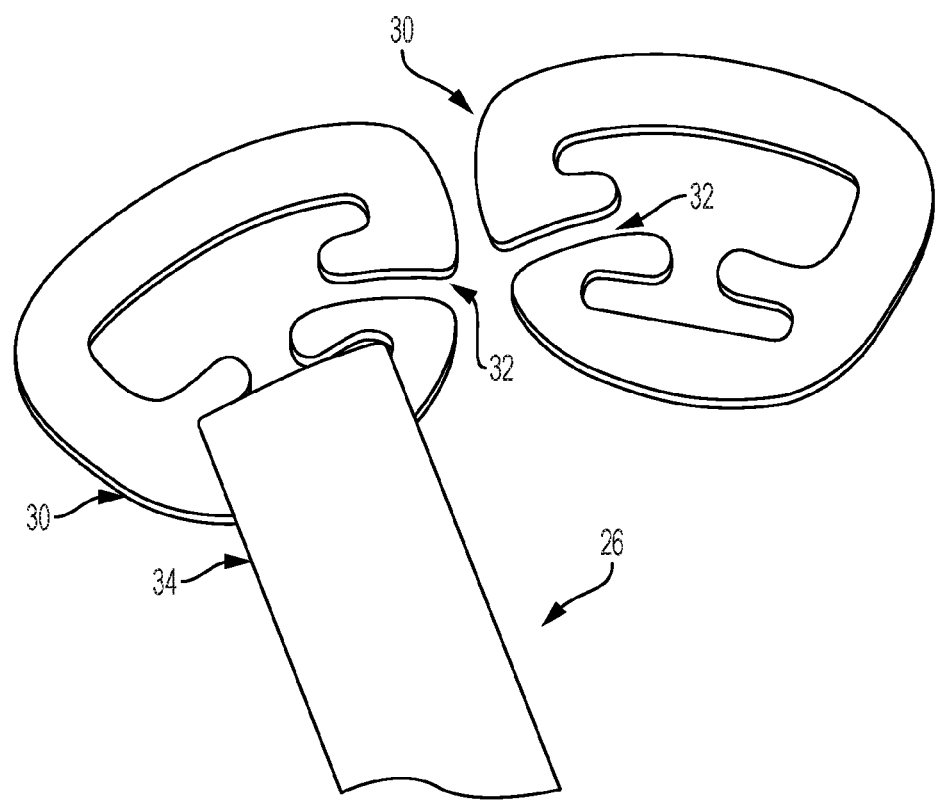
FIG. 4 is view of the center strap coupled to one of the plates and the other plate removed from the center strap.
Figure 6:
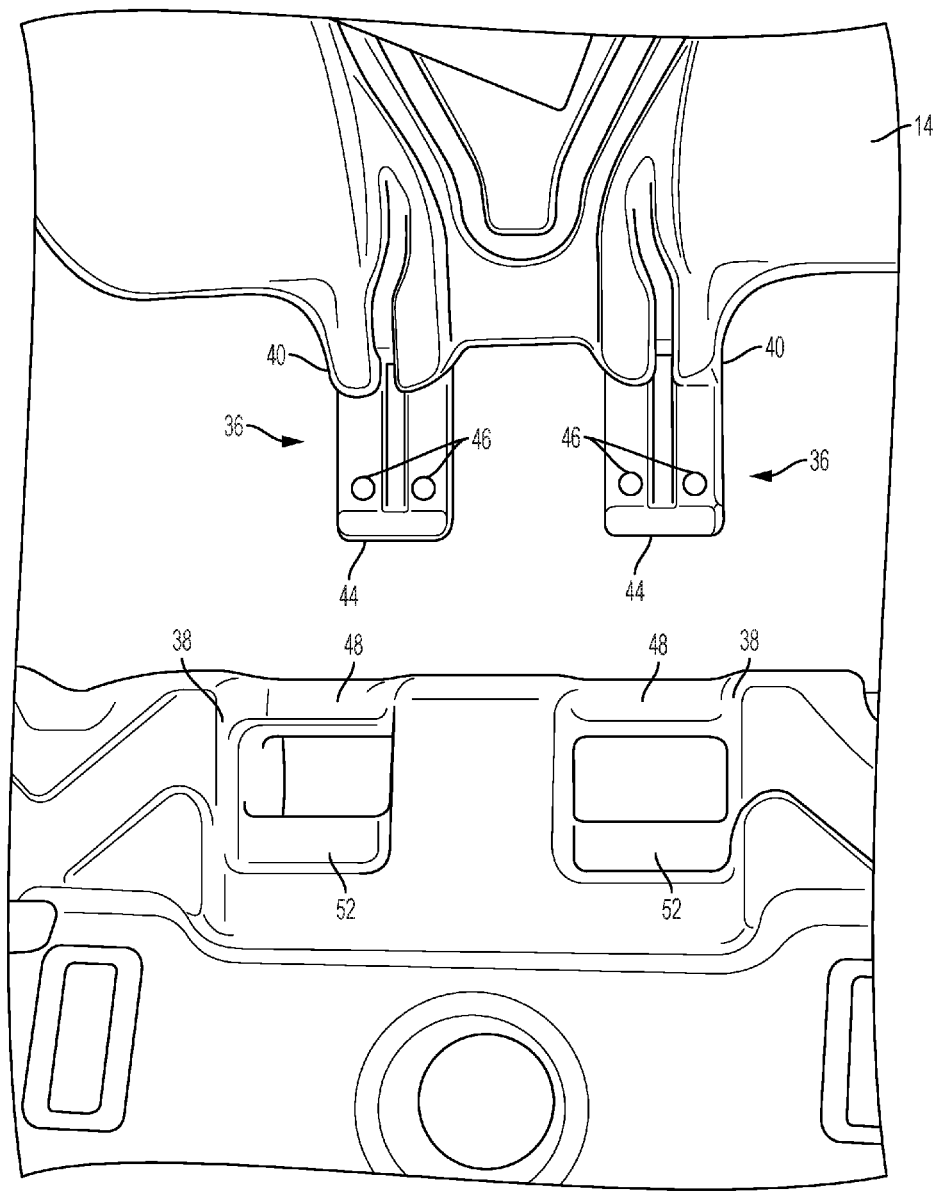
FIG. 6 is a view of a back of the bottom portion of the seat back and a bottom of the rear portion of the seat bottom of the car seat of FIG. 1 showing the pair of post and the pair of apertures on the rear portion of the seat bottom.

As shown in FIG. 4, each metal plate 20 includes a slit 32 through which a loop 34 of center strap 26 is positioned to hook plates 20 on loop 34. Similarly, loops 28 are positioned through slits 32 to hook plates 20 on loops 28. To adjust the position of shoulder straps 22 on seat back 14, plates 30 are removed from loops 28 so that straps 22 can be pulled through the respective slots in seat back 14 and straps 22 are feed back through slots at different height to adjust the height of straps 22 on the front of seat back 14. As shown in FIG. 6, plates 30 are flipped relative to each other so that slits 32 extend in substantially opposite directions. One of plates 30 is shown removed from loop 34 in FIG. 4.

Figure 5:
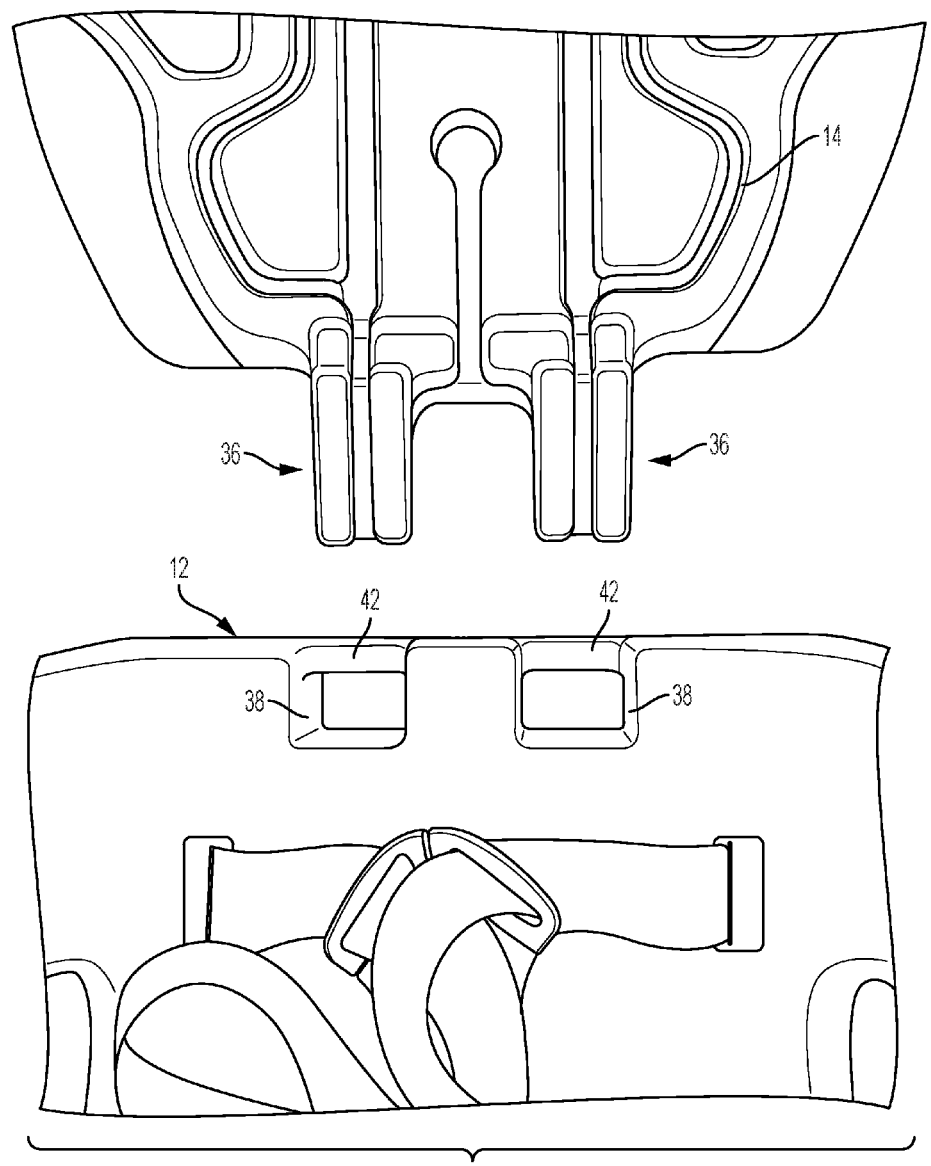
FIG. 5 is a view of a front of bottom portion of the seat back and a top of a rear portion of the seat bottom of the car seat of FIG. 1 showing the bottom portion including a pair of post for insertion into a pair of apertures on the rear portion of the seat bottom.
Figure 7:
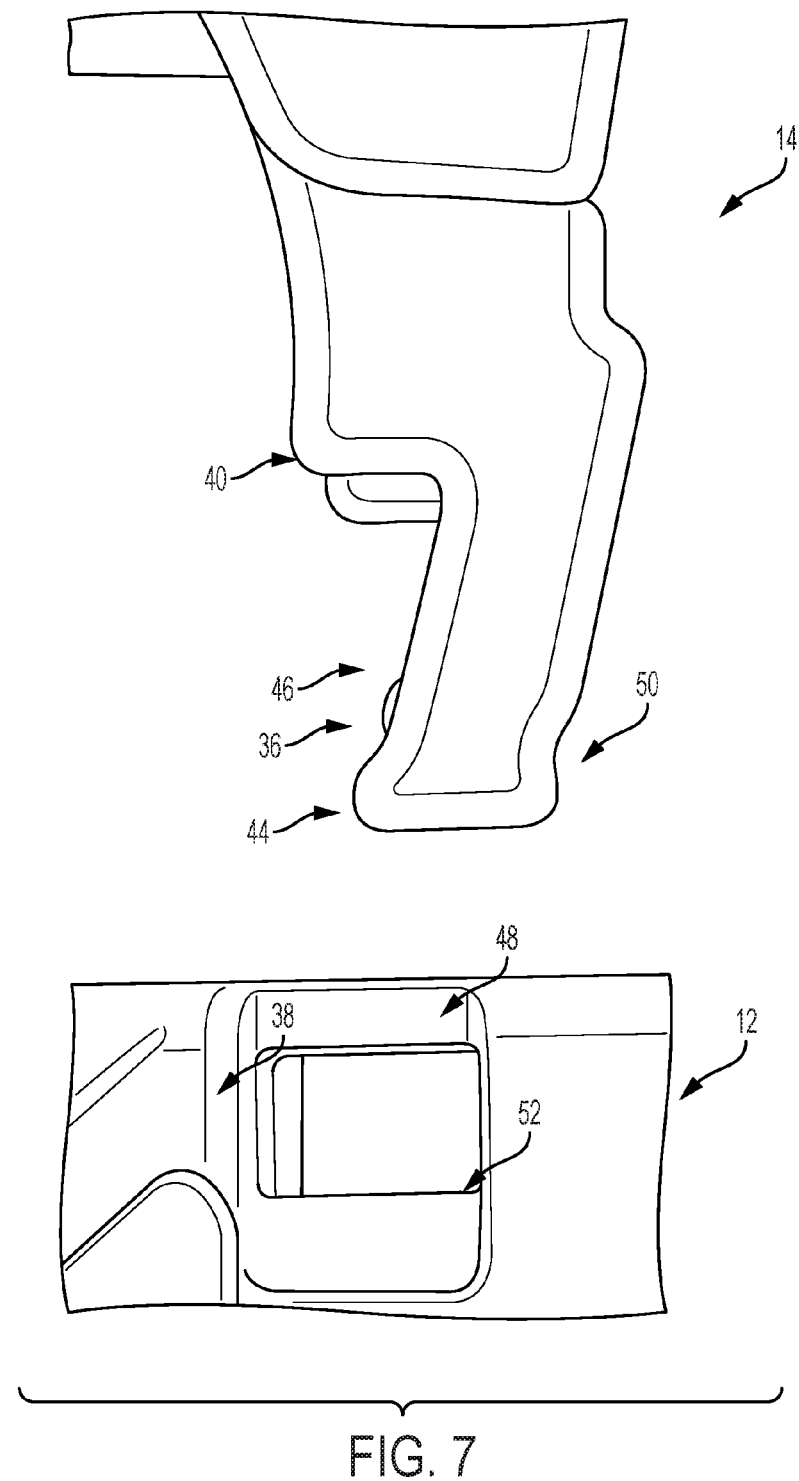
FIG. 7 is side view of the posts of FIGS. 5 and 6.
Figure 8:
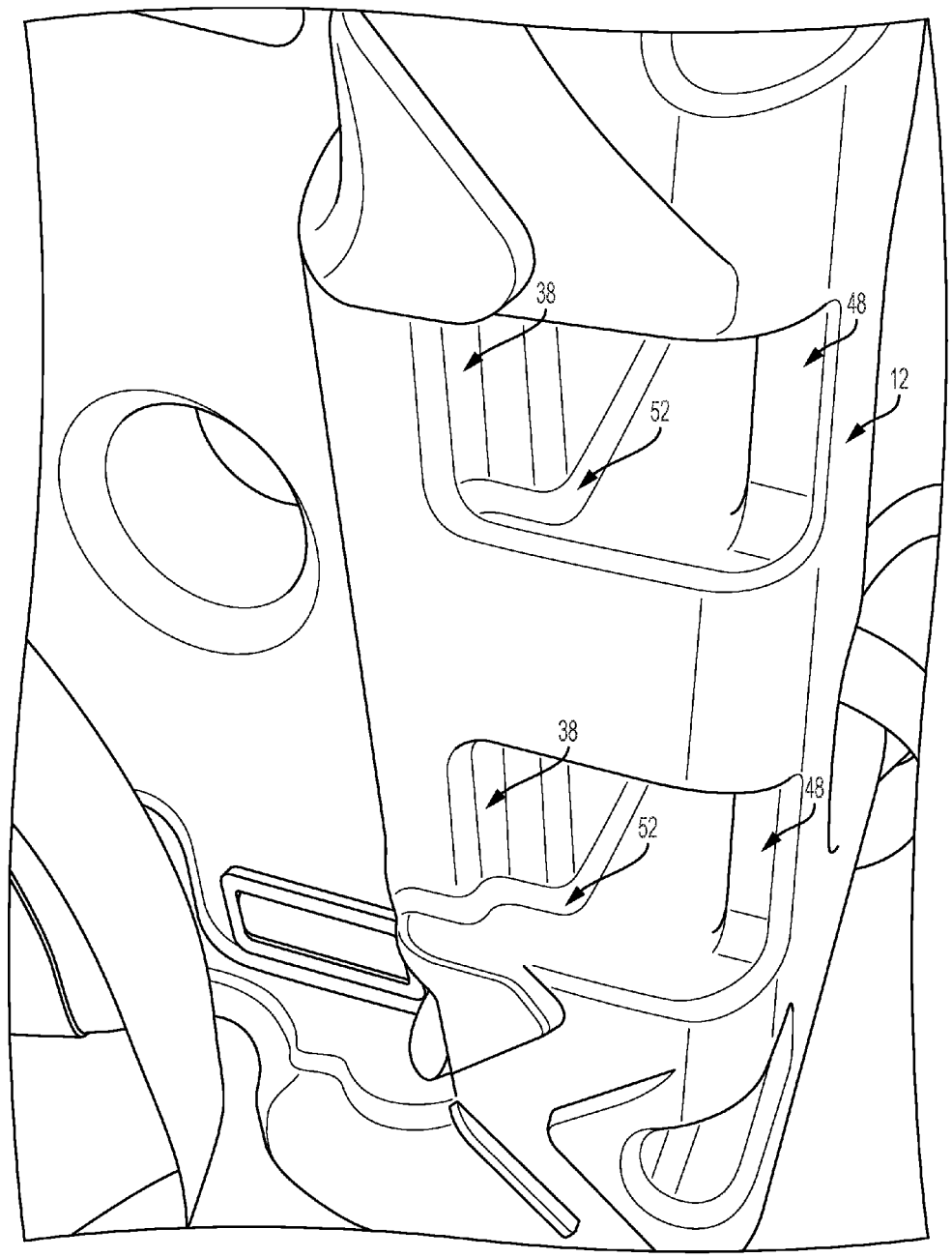
FIG. 8 is bottom perspective view of the apertures of FIGS. 5 and 6.
Figure 9:
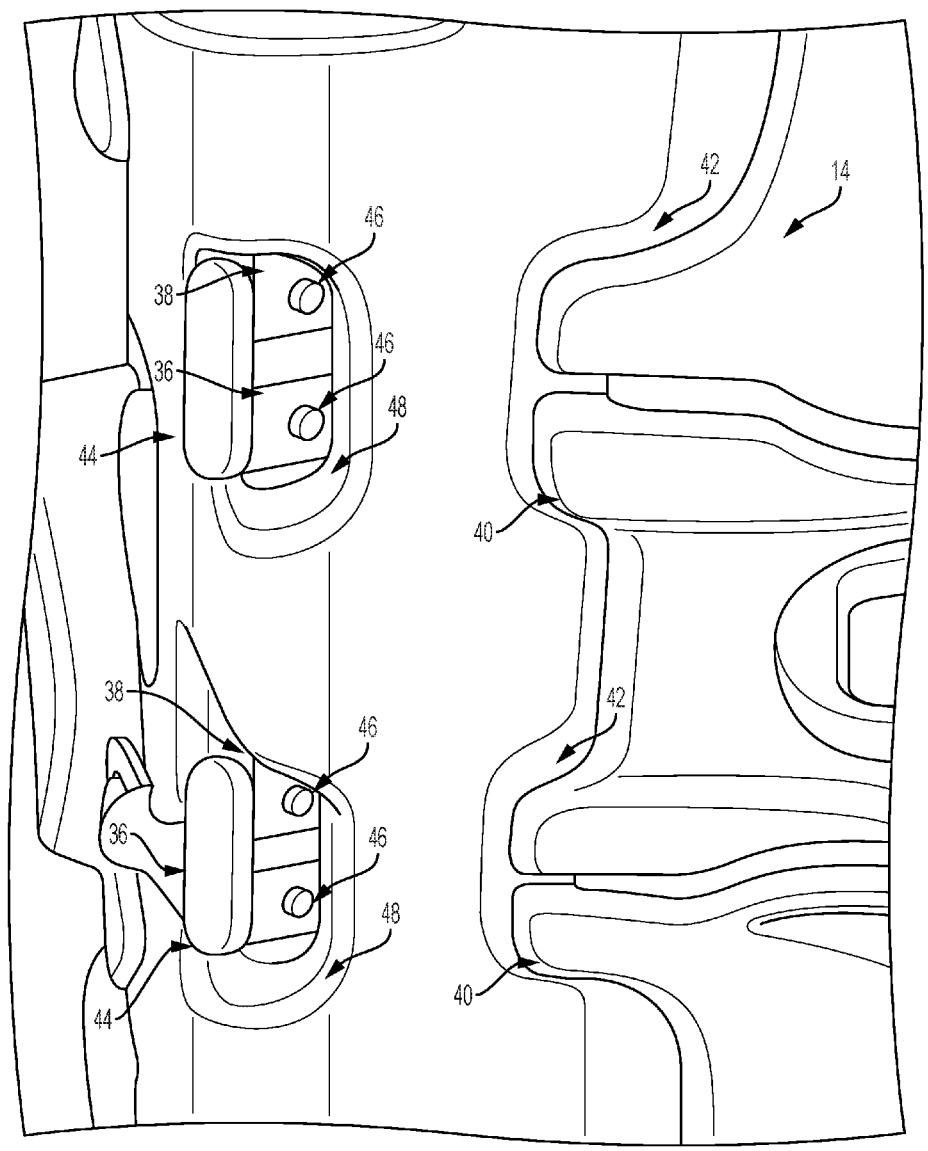
FIG. 9 is another bottom perspective view showing the pair of posts inserted into the apertures.

As shown in FIG. 5, seat back 14 includes a pair of posts 36 and seat bottom 12 includes a pair of apertures 38 sized to receive posts 36 to couple seat back 14 to seat bottom 12. Each post 36 includes a corner or step 40 that rests on a ledge 42 of seat bottom 12 to control the downward position of seat back 14 relative to seat bottom 12. As shown in FIG. 7, each post 36 includes a lip 44 that and a pair of round protrusions 46 that rests on a ledge 48 of seat bottom 12 to control the upward position of seat back 14 relative to seat bottom 12. Each post 36 also includes a recess 50 that receives a corner 52 of seat bottom 12.

During assembly of seat back 14 and seat bottom 12, lips 44 are first inserted into apertures 38 over ledges 42 with seat back 14 tilted rearward of seat bottom 14 at about 145 degrees so that lips 44 are positioned in apertures 38. Next, seat back 14 is rocked side to side with seat bottom 12 resting on a level surface and seat back 14 is titled forward toward the position shown in FIGS. 1-4. During this rocking motion, protrusions 46 ride over ledges 42 as posts 36 slide further into apertures 38. Because seat back and seat bottom are mode of plastic, the components flex and compress during the rocking motion allowing the interfering features, such as lips 44 and protrusions 46 on ledges 42, to slide past one another. Eventually, lips 44 and protrusions 46 pass ledge 42 and return to their uncompressed shape. In the uncompressed shape, protrusions 46 block posts 36 from being withdrawn from apertures 38. If seat back 14 is tilted back, corners 52 of seat bottom 12 are received in recesses 50 providing further resistance to separation of seat back 14 and seat back 12. To remove seat back 14 from seat bottom 12, the assembly process is reversed (i.e. seat back 14 is rocked side to side as it is pulled away from seat bottom 14 and titled rearward).

Figure 10:
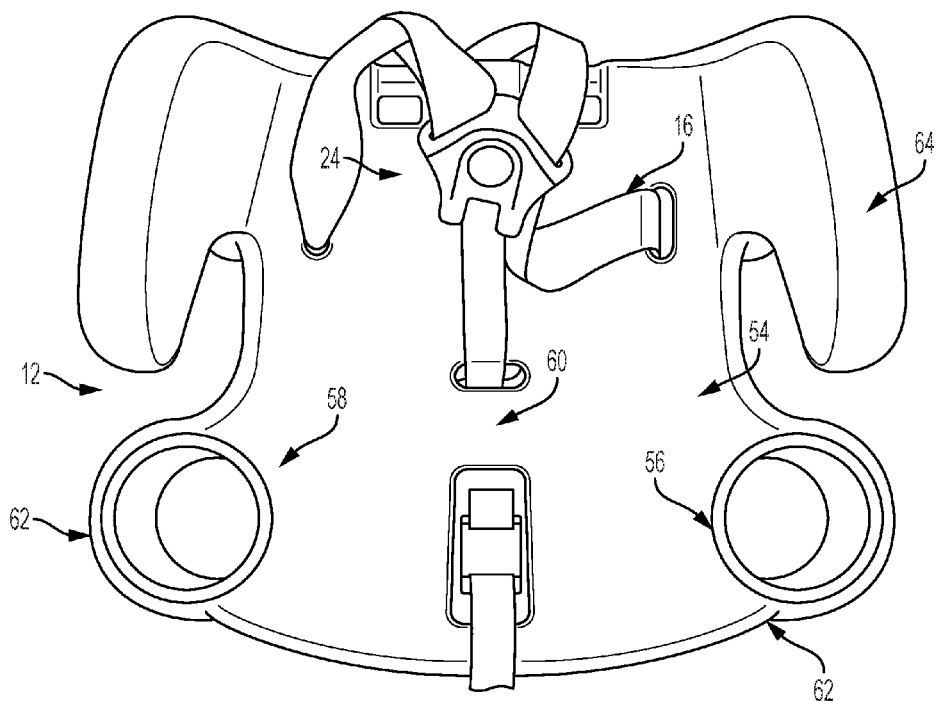
FIG. 10 is top plan view of the seat bottom.
Figure 11:
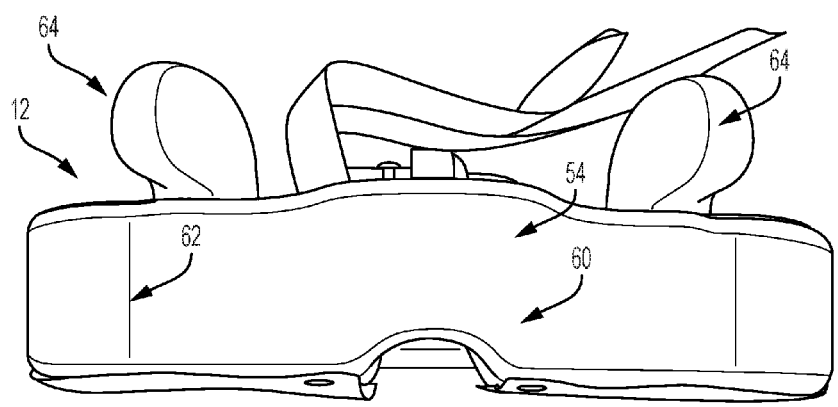
FIG. 11 is a front view of the seat bottom.

As shown in FIG. 10, seat bottom 12 includes a main body 54, a cup holder insert 56, and a snack holder insert 58. According to the preferred embodiment of the present disclosure, main bodies 54, 18 of respective seat bottom 12 and seat back 14 are made of plastic and blow molded so they are each substantially hollow. Head rest 18 and inserts 56, 58 are preferably made of plastic and injection molded.

Figure 16:
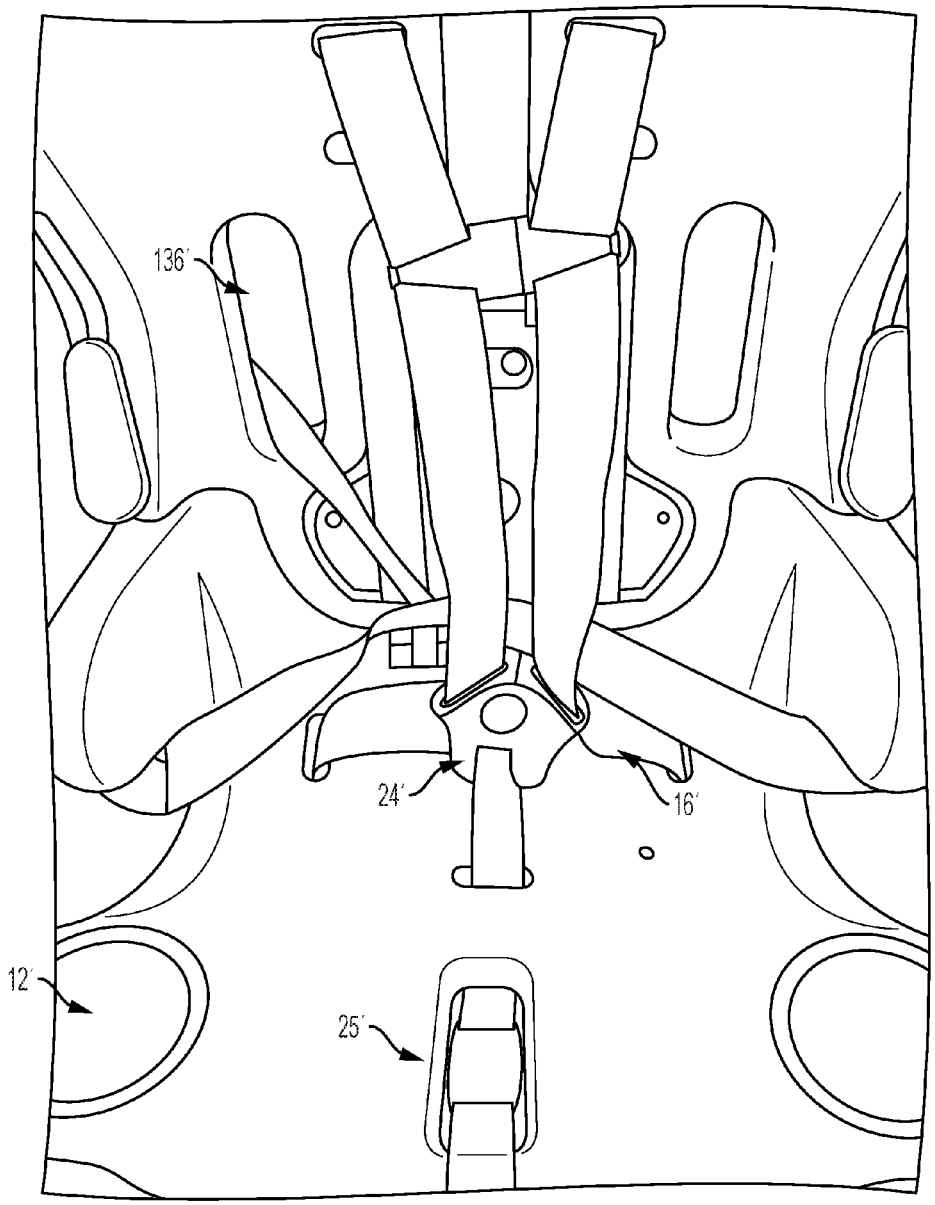
FIG. 16 is a front view of the car seat of FIG. 14.
Figure 17:
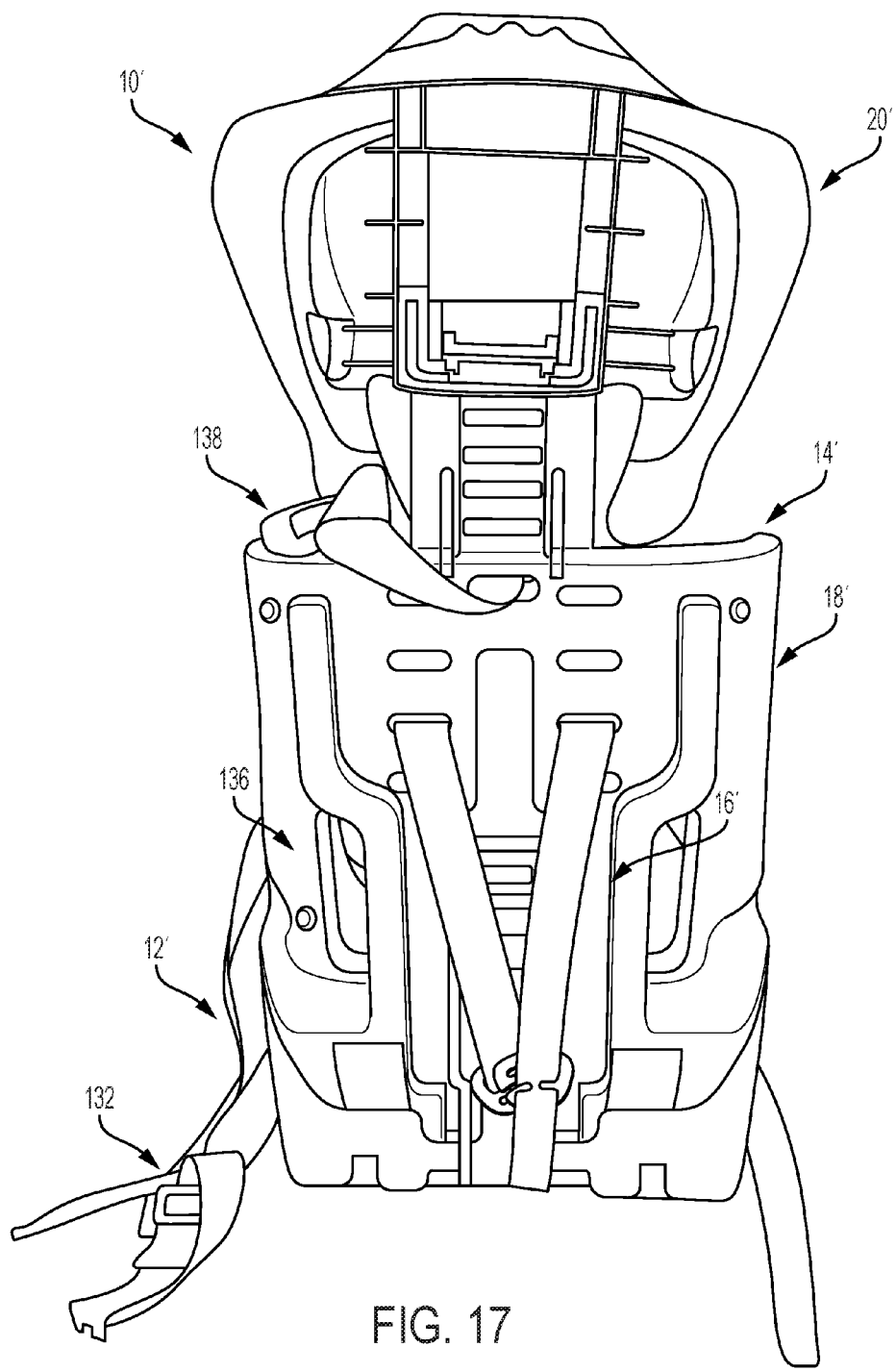
FIG. 17 is a rear view of the car seat of FIG. 14 showing the upholstery removed.

Main body 54 of seat bottom 12 includes a seat portion 60, a pair of holder portions 62 that are integral with seat portion 60, and arm rests 64 that are integral with seat portion 60. Because main body 54 is blow molded, an interior space 66 (see FIGS. 16 and 17) extends continuously through seat portion 60, holder portions 62, and arm rests 64.

Figure 12:
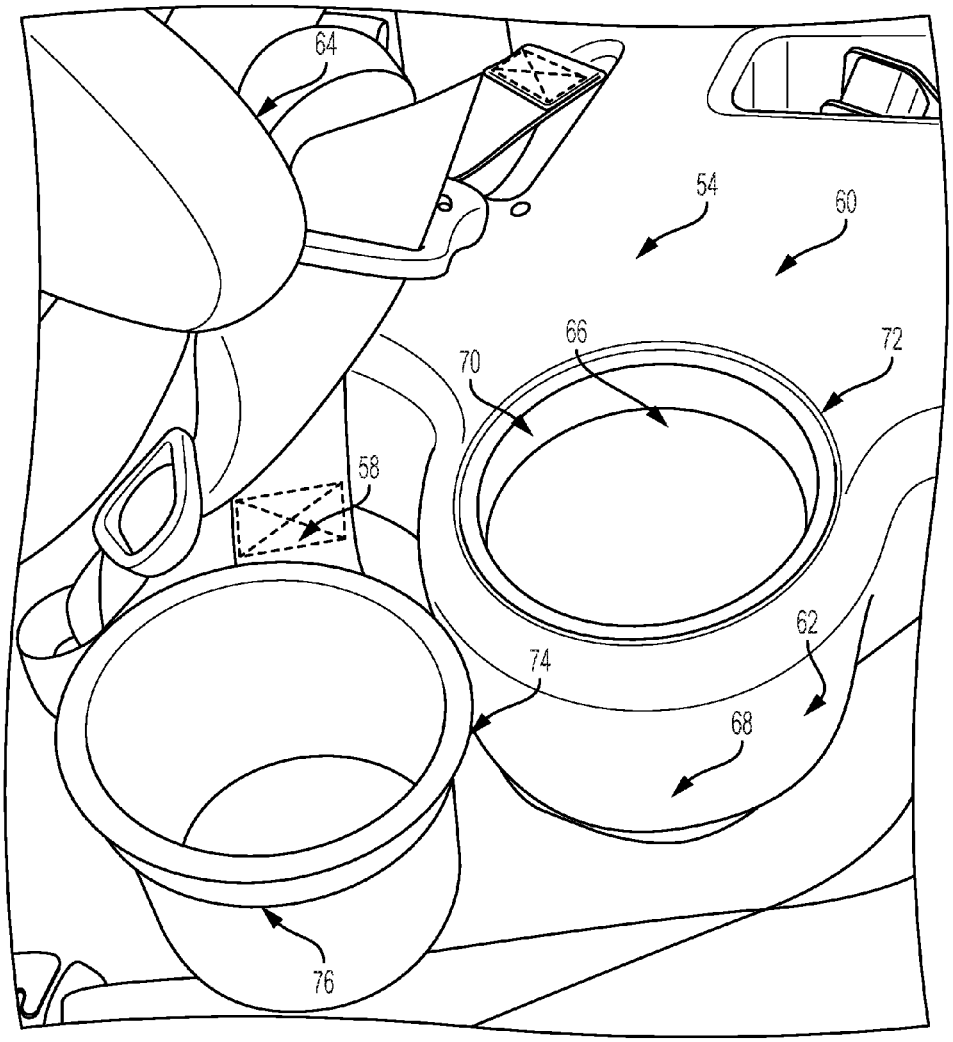
FIG. 12 is a perspective view of a cup holder removed from the seat bottom.
Figure 13:
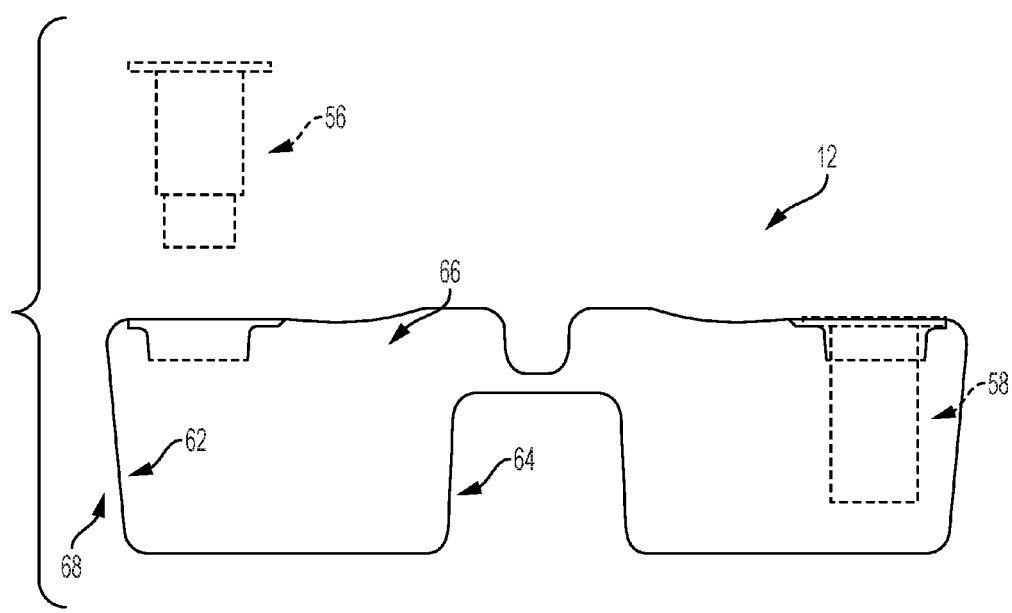
FIG. 13 is a diagrammatic side view of the car seat of FIG. 1 showing one cup holder (in phantom) positioned for insertion into the hollow main body and another cup holder inserted into hollow main body.

As shown in FIG. 12, holder portions 62 having an outer wall 68 that matches the contour of inserts 56, 58. These outer walls 68 merge with outer walls of seat portion 60. Holder portions 62 each include an aperture 70 that receives respective inserts 56, 58. During molding of main body 54 of seat bottom 12, apertures 70 do not exist in holder portions 62. Rather, apertures 70 are covered up or enclosed by a disc of blow molded plastic (not shown) that is integral with respective holder portions 62. These discs are cut out of holder portions 62 to form apertures 70 in recesses 72 of holder portions 62. After the discs are removed to create apertures 70, inserts 56, 58 are positioned in apertures 70. Each insert 56, 58 includes an upper lip 74 and a rib 76. The perimeter of rib 76 is larger than aperture 70 and slides past the rim defining aperture 70 during insertion. Because it is larger than aperture 70, rib 76 blocks removal of inserts 56, 58 from apertures 70. Upper lip 74 nests within the upper portion of recess 72 to control the depth of insertion of inserts 56, 58. After insertion, inserts 56, 58 are positioned within interior space 66, they cooperate with outer walls 68 of holder portions 62 to define a space 78 that is part of interior space 66 and continuous with the remainder of interior space 66. The outer surfaces of inserts 56, 58 are surrounded by interior space 66 and when assembly, an interior space 80 of inserts 56, 58 overlaps with interior space 66 of main body 54.

Figure 14:
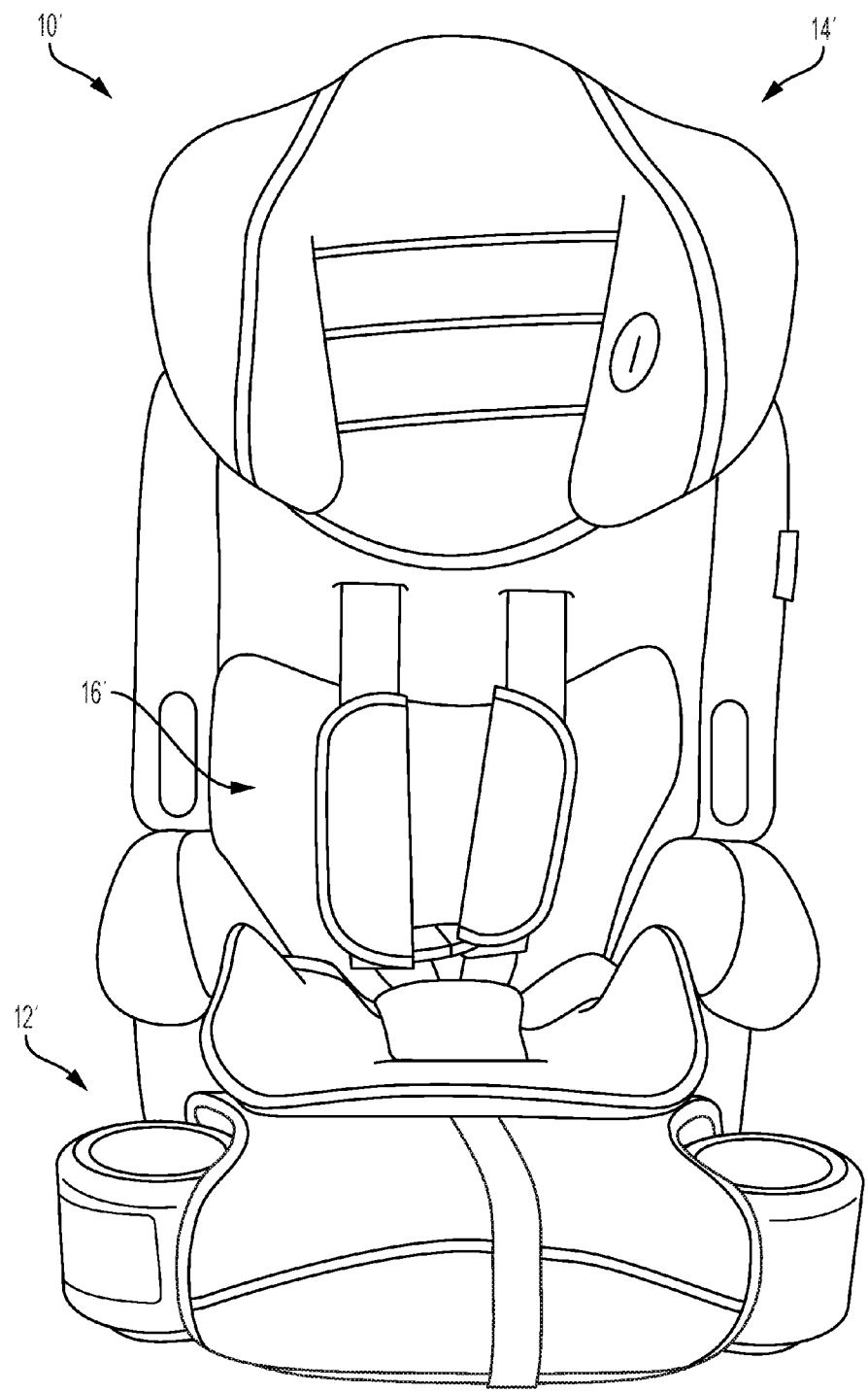
FIG. 14 is a front perspective view of an alternative embodiment car seat including a seat bottom and a seat back covered by upholstery.

FIG. 14 shows another exemplary car seat 10'. Car seat 10' includes a seat bottom 12', a removable seat back 14', and a removable harness 16'. When seat bottom 12', seat back 14', and harness 16' are coupled together, car seat 10' functions as a harnessed booster seat. When harness 16' is removed, seat 10' functions as a high back booster seat. When seat back 14' is removed from seat bottom 12', seat bottom 12' functions as a low back booster seat.

Seat back 14' includes a main body 18' and a headrest 20' that can be adjusted upward and downward relative to the main body 18' to provide an adjustable headrest for a child sitting on car seat 10' when seat back 14' is coupled to seat bottom 14'. Main body 18' of seat back 14' and seat bottom 12' are formed of a plastic material using a blow molding process. As such, main body 18' and seat bottom 12' have cavities that are defined by plastic material.

Figure 18:
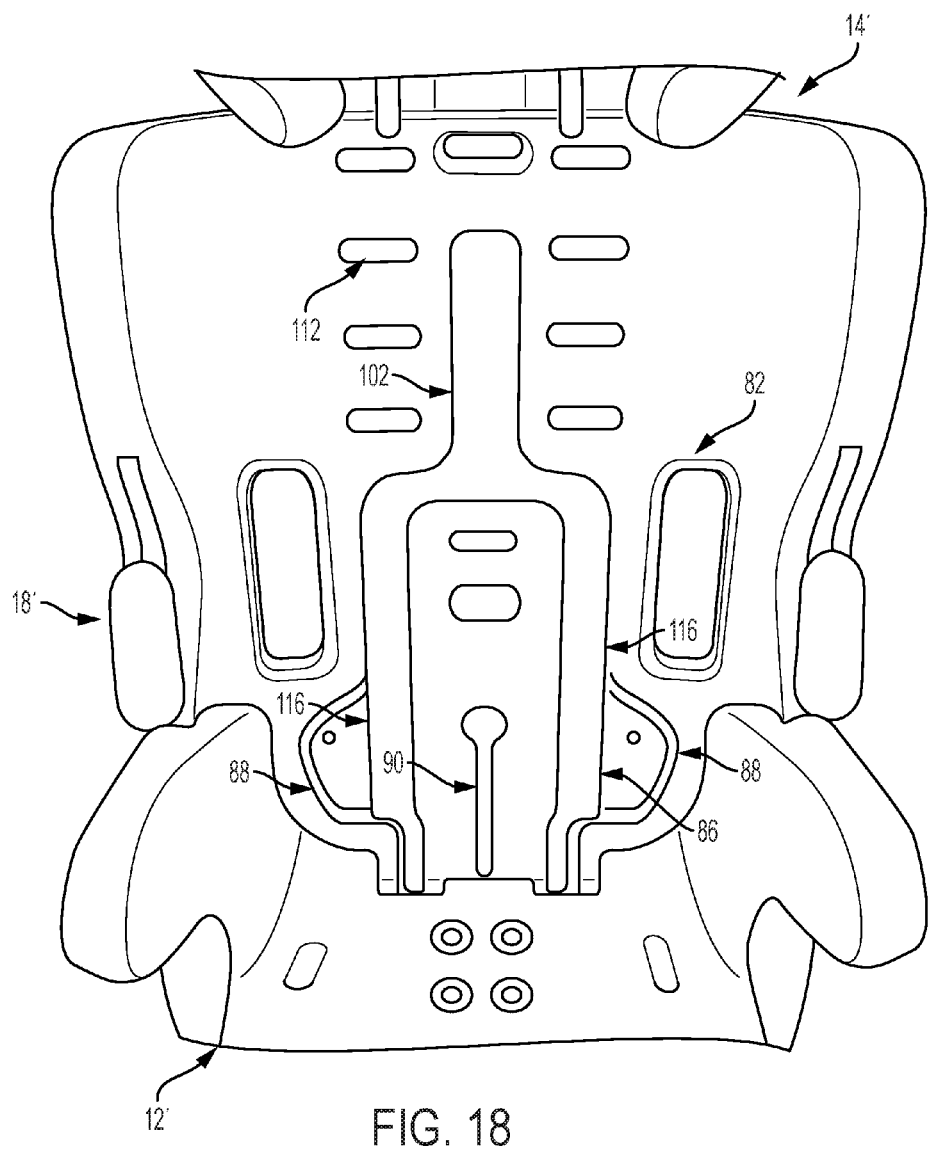
FIG. 18 is a front view of the car seat of FIG. 14.
Figure 19:
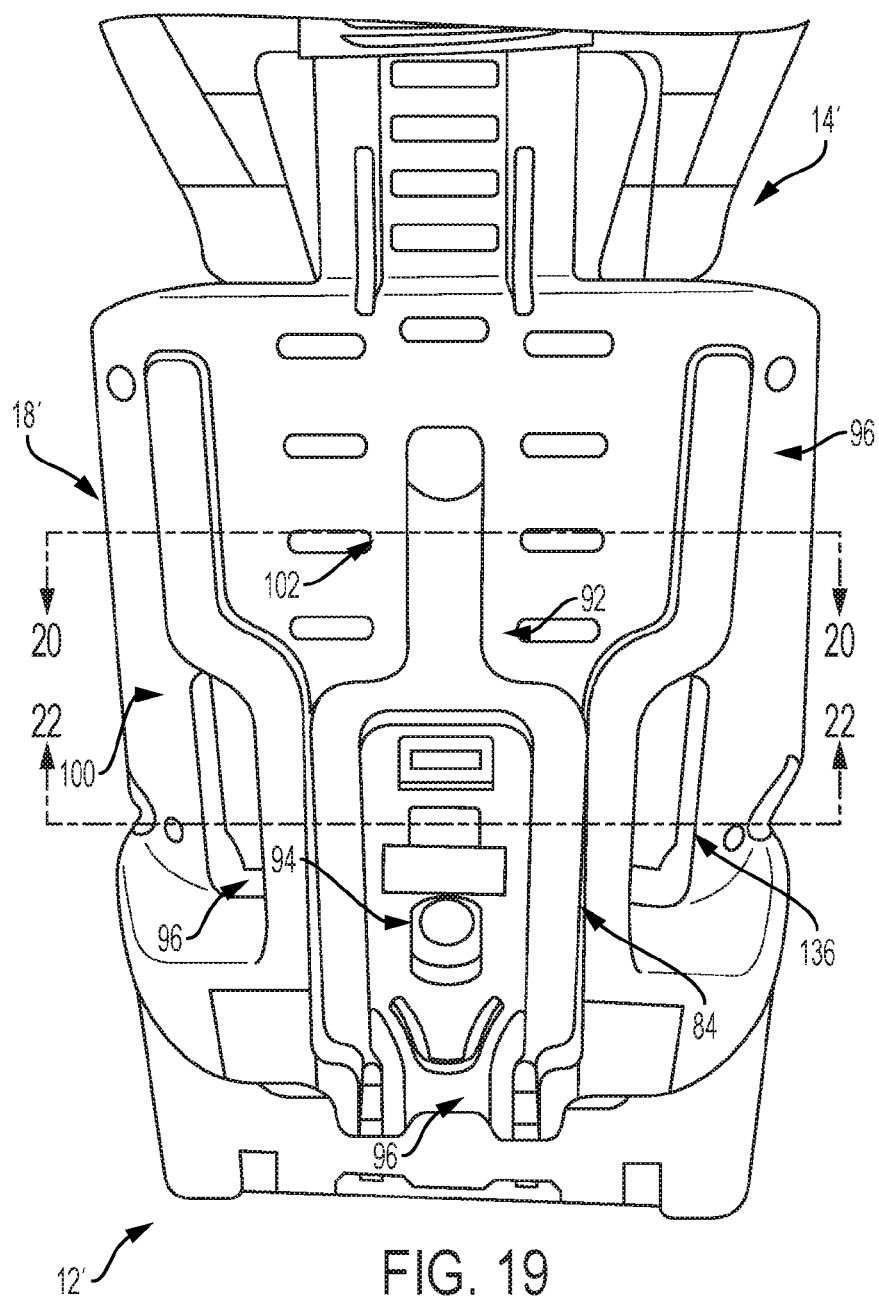
FIG. 19 is a rear view of the car seat of FIG. 14 showing a harness removed.

As shown in FIGS. 18 and 19, a front side 82 and a back side 84 of main body 18 include several protrusions and recesses that strengthen main body 18. Specifically, front side 82 includes a first inverted wishbone-shaped recess 86, a pair of C-shaped recesses 88, and a keyhole-shaped recess 90 as shown in FIG. 18. As shown in FIG. 19, back side 84 includes a second inverted wishbone-shaped recess 92, a rounded rectangle-shaped recess 94, and a U-shaped recess 96. Additionally, back side 84 includes a pair of protrusions 98 that are substantially straight except for jogs 100.

Figure 20:
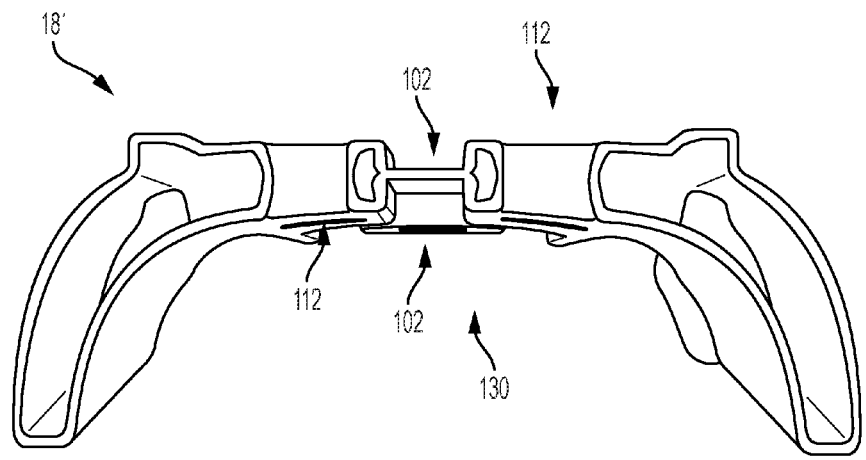
FIG. 20 is a cross-sectional view taken along line 20-20 of FIG. 19.
Figure 21:
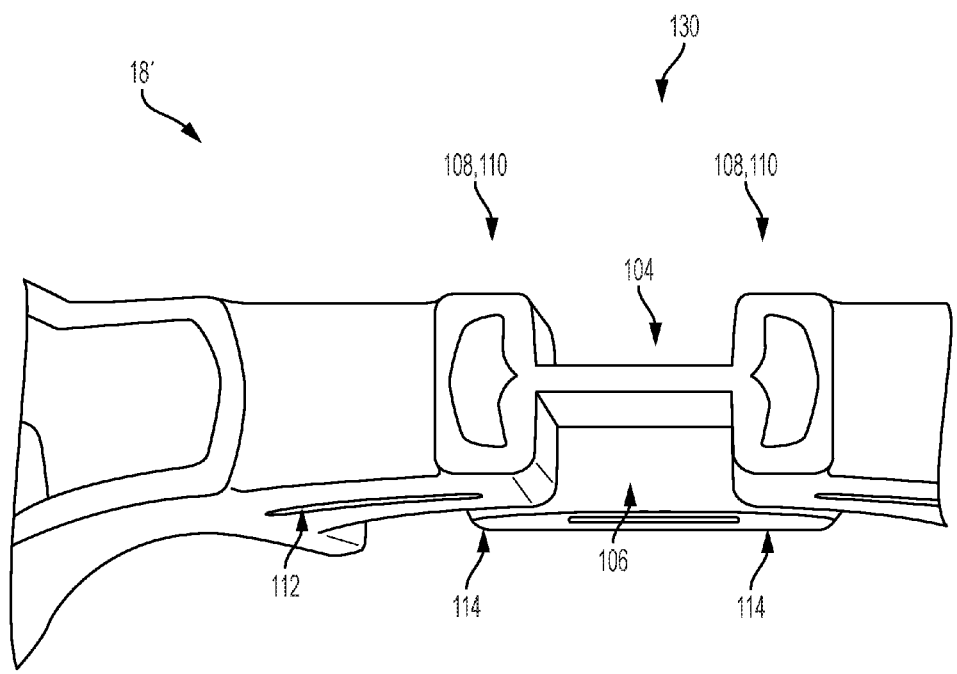
FIG. 21 is an enlarged view of a portion of FIG. 20.

As shown in FIGS. 19 and 20, first and second inverted wishbone-shaped recesses 86, 92 are positioned adjacent to each other so that front and back sides 82, 84 merge together. At the location of the cross section of FIG. 20, this merging occurs at an upper leg 102 of recesses 86, 92 to form a mid-section 104 of an I beam 106 as shown in FIG. 21. Ends 108 of I beam 106 are formed by portions of side walls 110 of recesses 86, 92. The cross-section of FIG. 20, extends through strap-receiving apertures 112, creating tubes 114 made of the plastic material.

Tubes 114 and I-beam 106 have nominal wall thicknesses that are greater than the nominal wall thickness of the remainder of main body 18'. For example, tubes 114 may have nominal wall thickness of 5 millimeters and mid-section 104 of 3.5 millimeters. The remainder of main body 18' may have a nominal wall thickness of 2 millimeters. According to alternative embodiments, other nominal wall thickness for tubes 114 may be provided such as 3, 3.5, 4, 4.5, 5.5, 6, 7, and 8 millimeters and other smaller and larger thickness. Similarly, according to alternative embodiments, other nominal wall thickness for mid-section 104 may be provided such as 1, 1.5, 2, 2.5, 3, 4, 4.5, 6, 7, and 8 millimeters and other smaller and larger thickness. Similarly, according to alternative embodiments, other nominal wall thickness for the reminder of main body 18 may be provided such as 0.5, 1, 1.5, 2, 2.5, 3.5, 4, 4.5, 6, 7, and 8 millimeters and other smaller and larger thickness.

Based on the above wall thicknesses, ratios of wall thickness are provided. For example, the ratio of the nominal thickness of tubes 112 to the remainder of main body 18 may be 5:2 or 2.5. Other values for this ratio may also be provided such as 1, 1.1, 1.2, 1.3, 1.4, 1.5, 1.6, 1.7, 1.8, 1.9, 2, 2.2, 2.4, 2.6, 2.8, 3, 3.5, 4, 5, 6 or smaller or larger values. In another example, the ratio of the nominal thickness of mid-section 104 to the nominal wall thickness of the remainder of main body 18 may be 3.5:2 or 1.75. Other values for this ratio may also be provided such as 0.7, 0.8, 0.9, 1, 1.1, 1.2, 1.3, 1.4, 1.5, 1.6, 1.7, 1.8, 1.9, 2, 2.2, 2.4, 2.6, 2.8, 3, 3.5, 4, 5, 6 or smaller or larger values. In yet another example, the ratio of the nominal wall thickness of tubes 112 to the nominal thickness of mid-section 104 may be 5:3.5 or 1.43. Other values for this ratio may also be provided such as 0.7, 0.8, 0.9, 1, 1.1, 1.2, 1.3, 1.4, 1.5, 1.6, 1.7, 1.8, 1.9, 2, 2.2, 2.4, 2.6, 2.8, 3, 3.5, 4, 5, 6 or smaller or larger values.

Figure 22:
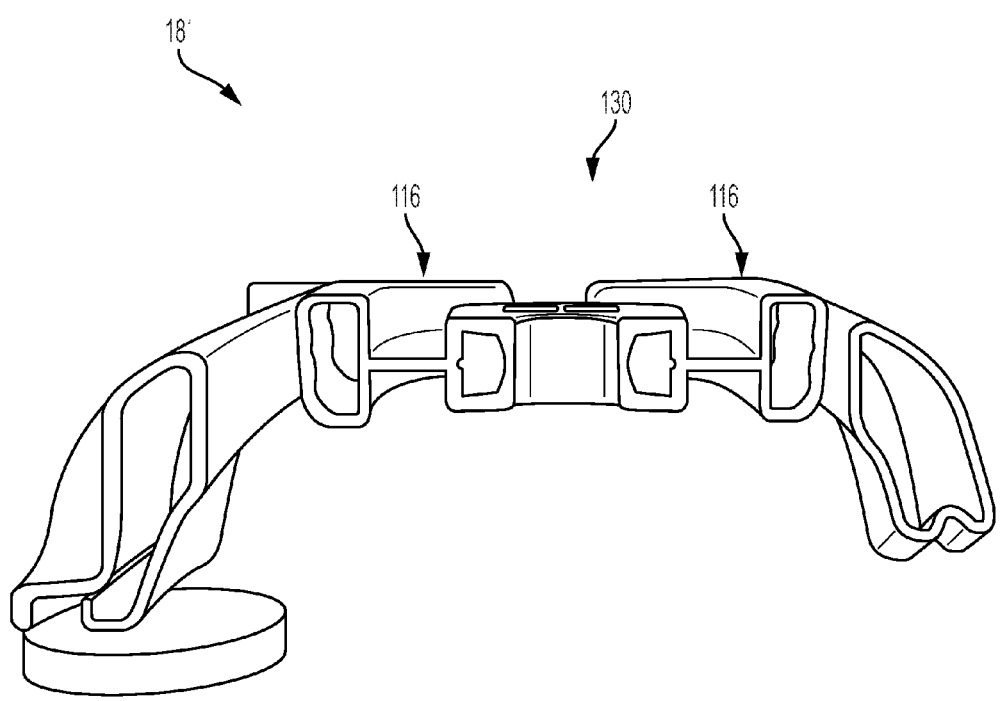
FIG. 22 is a cross-sectional view taken along line 22-22 of FIG. 19.
Figure 23:
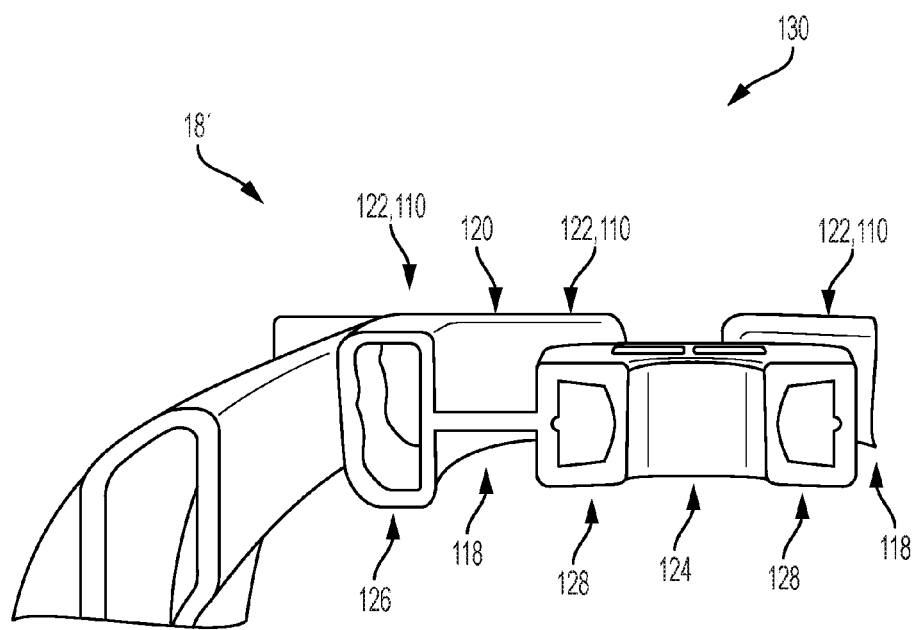
FIG. 23 is an enlarged view of a portion of FIG. 22.

FIGS. 21 and 22 also illustrate how first and second inverted wishbone-shaped recesses 86, 92 are positioned adjacent to each other so that front and back sides 82, 84 merge together. At the location of the cross section of FIG. 21, this merging occurs at lower legs 116 of recesses 86, 92 to form mid-sections 118 of I beam 120. Ends 122 of I beams 120 are formed by portions of side walls 110 of recesses 86, 92. The cross-section of FIG. 22, extends through central aperture 124, creating tubes 126, 128 on either side of I beam 120 made of the plastic material. The nominal wall thicknesses of tubes 126, 128 are similar to those of tubes 112 discussed above and the nominal thickness of I beam 120 are similar to those of I beam 106 discussed above. Similarly, the various ratios discussed above for tubes 112 may also be provided for tubes 126, 128 and the various ratios discussed above for I beam 106 may also be provided for I beam 120. An upper end of keyhole-shaped recess 90 and rounded rectangle-shaped recess 94 also merge front and back sides 82, 84.

Providing thicker walls for tubes 112, 126, 128 and/or I beams 106, 120 strengthens a core 130 of main body 18'. Depending on the type of installation of seat 10 in a vehicle, various anchor straps wrap around core 130. Thus, by strengthening core 130 by providing it with tubes 112, 126, 128; I beams 106, 120; and/or thicker walls, core 116 is better able to withstand forces caused by the anchor straps during vehicle impacts or other sudden deceleration events. Additionally, but providing thinner walls in the remainder of main body 18 reduces the amount of material, resulting in car seat 10 weighing less.

Figure 15:
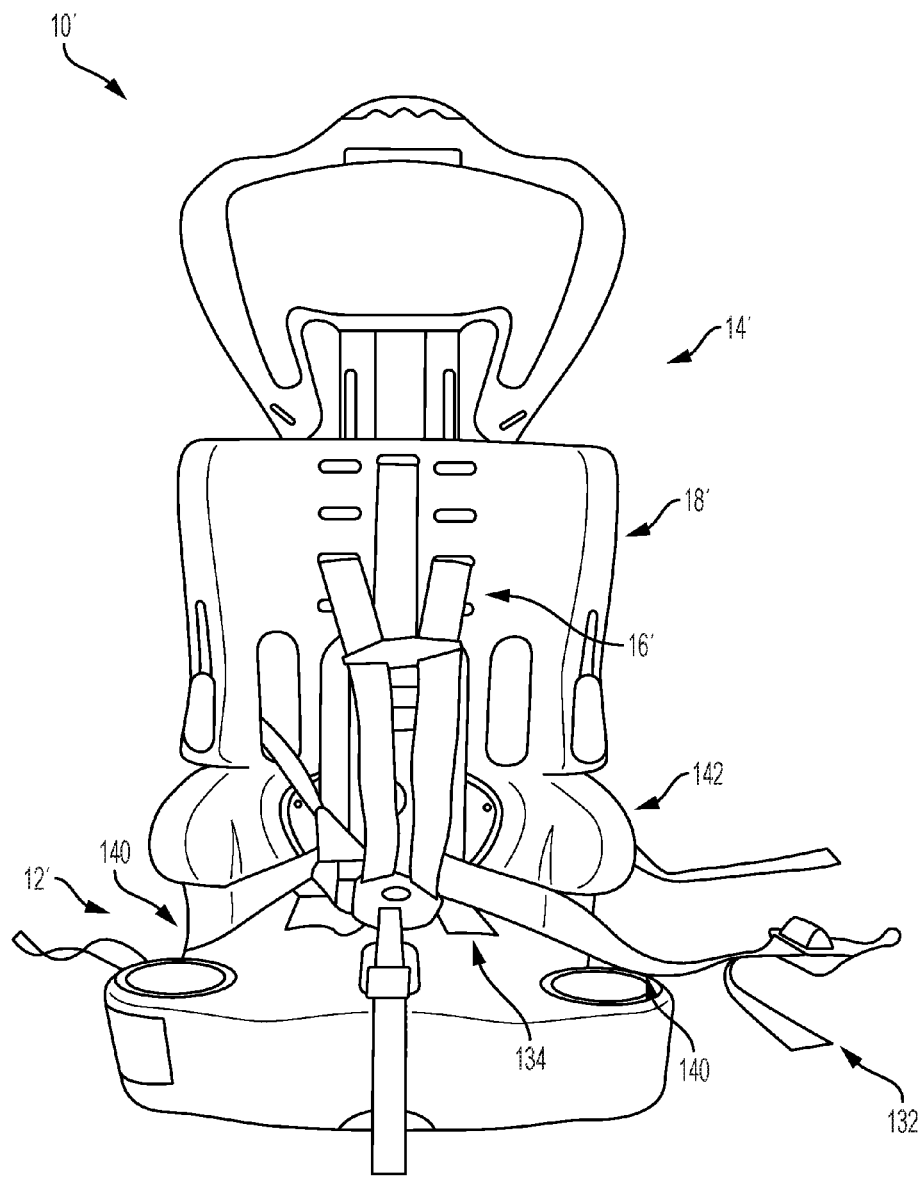
FIG. 15 is a front view of the car seat of FIG. 14.

According to one installation technique, a latch strap 132 is provided as shown in FIG. 15. Opposite ends of latch strap 132 hook to the lower anchors of a LATCH system (Lower Anchors and Tethers for Children safety system) provided in LATCH compliant vehicles. A mid-section 134 of latch strap 132 extends around core 130 through openings 136 in main body 18 so that mid-section 134 is positioned in front of core 130. An upper latch strap 138 is attached to the upper anchor of the LATCH system. According to an alternative arrangement, upper latch strap 138 may not be anchored to the upper anchor of the LATCH system.

According to another installation technique, opposite ends of latch strap 132 also hook to the lower anchors of a LATCH system (Lower Anchors and Tethers for Children safety system) provided in LATCH compliant vehicles. Mid-section 134 of latch strap 132 extends around core 130 through openings 136 in main body 18 so that mid-section 134 is positioned behind core 130. Side portions 140 of latch strap 132 extend under arm rests 142. Upper latch strap 138 is attached to the upper anchor of the LATCH system. According to an alternative arrangement, upper latch strap 138 may not be anchored to the upper anchor of the LATCH system.

According to another installation technique in older non-LATCH compliant vehicles, the seat belt of the vehicle may be used to secure seat 10' to the vehicle. When using a lap belt only seat belt, the lap belt may be fed from the rear of main body 18' through one of openings 136, across the front of core 130, back through the other opening 136 and then latched. As a result, a mid-section of the lap belt extends across a front of core 130. Upper latch strap 138 may or may not be attached to the upper anchor of the LATCH system.

According to another installation technique in older non-LATCH compliant vehicles, the seat belt of the vehicle may be used to secure seat 10 to the vehicle. When using a lap belt only seat belt, the lap belt may be fed from the front of main body 18' through one of openings 136, across the back of core 130, back through the other opening 136 and then latched. As a result, a mid-section of the lap belt extends across a back of core 130. Upper latch strap 138 may or may not be attached to the upper anchor of the LATCH system.

According to another installation technique in older non-LATCH compliant vehicles, the seat belt of the vehicle may be used to secure seat 10 to the vehicle. When using a lap and shoulder seat belt, buckle of the seat belt may be fed from the front of main body 18' through one of openings 136, across the back of core 130, back through the other opening 136 and then latched. As a result, mid-sections of the shoulder belt and lap belt extend across a rear of core 130. Upper latch strap 138 may or may not be attached to the upper anchor of the LATCH system.

According to another installation technique in older non-LATCH compliant vehicles, the seat belt of the vehicle may be used to secure seat 10 to vehicle 10. When using a lap and shoulder seat belt, buckle of the seat belt may be fed from the back of main body 18 through one of openings 136, across the front of core 130, back through the other opening 136 and then latched. As a result, mid-sections of the shoulder belt and lap belt extend across a front of core 130. Upper latch strap 138 may or may not be attached to the upper anchor of the LATCH system.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains.

The invention claimed is:

1. A car seat configured to support a child in a vehicle, the car seat including
    a seat bottom, the seat bottom having a continuous wall including an upper seat wall portion, a lower seat wall portion, and a plurality of side seat wall portions, the upper, lower, and side seat wall portions collectively having an interior wall defining an interior seat bottom void; the upper, lower, and side seat wall portions all facing a common first point;
    a seat back removably coupled to the seat bottom, the seat back having a continuous wall including a front wall portion, a rear wall portion, and a plurality of seat-back side wall portions, the front, rear, and seat-back side wall portions collectively having an interior wall defining an interior seat back void; the front, rear, and seat-back side wall portions all facing a common second point, and
    a harness including shoulder straps positioned to extend over the shoulders of a child positioned in the car seat and at least one strap joined to the shoulder straps and extending to the seat bottom, the length of the shoulder straps being adjustable with the at least one strap.

2. The car sear of claim 1, wherein the at least one strap extends through the seat bottom.

3. The car seat of claim 2, wherein the harness further includes a clamp securing the at least one strap to the seat bottom and permitting adjustment of the position of the at least one strap relative to the seat bottom.

4. A car seat configured to support a child in a vehicle, the car seat including
    a seat bottom having an interior void, the seat bottom having a continuous wall including an upper seat wall portion, a lower seat wall portion, and a plurality of side seat wall portions, the upper, lower, and side seat wall portions collectively having an interior wall defining the interior void; the upper, lower, and side seat wall portions all facing a common first point,
    a seat back coupled to the seat bottom, and
    a cup holder positioned in the interior void of the seat bottom.

5. The car seat of claim 4, wherein the seat bottom includes an aperture and the cup holder extends through the aperture into the interior void of the seat bottom.

6. The car seat of claim 5, wherein the aperture is defined by an edge positioned adjacent to the interior void of the seat bottom.

7. A car seat configured to support a child in a vehicle, the car seat including
    a seat bottom, and
    a seat back coupled to the seat bottom, the seat back having channels defining a Y-shaped recess strengthening the seat back, the seat back further having a continuous wall including a front wall portion, a rear wall portion, and a plurality of seat-back side wall portions, the front, rear, and seat-back side wall portions collectively having an interior wall defining an interior seat back void; the front, rear, and seat-back side wall portions all facing a common point.

8. The car seat of claim 7, wherein at least one of the front wall portion and back wall portion of the seat back includes the channels defining the Y-shaped recess.

9. The car seat of claim 8, wherein the front wall portion includes the channels defining the Y-shaped recess.

10. The car seat of claim 9, wherein the channels defining the Y-shaped recess merge with the back wall portion of the seat back.

11. The car seat of claim 9, wherein the back wall portion includes the channels defining a second Y-shaped recess.

12. The car seat of claim 8, wherein the back wall portion includes the channels defining the Y-shaped recess.

13. The car seat of claim 12, wherein the channels defining the Y-shaped recess merge with the front wall portion of the seat back.

14. The car seat of claim 8, wherein the Y-shaped recess is inverted.

15. The car seat of claim 7, wherein the channels provide a Y-shaped wall.

16. A car seat configured to support a child in a vehicle, the car seat including
    a seat bottom, and
    a seat back coupled to the seat bottom, the seat back having a continuous wall including a front wall portion, a rear wall portion, and a plurality of seat-back side wall portions, the front, rear, and seat-back side wall portions collectively having an interior wall defining an interior seat back void; the front, rear, and seat-back side wall portions all facing a common point, the seat back front wall portion and back wall portion merge together to form a beam.

17. The car seat of claim 16, wherein the front wall portion and back wall portion cooperate to define lateral edges of the seat back and the beam is spaced apart from the lateral edges.

18. The car seat of claim 16, wherein beam is an I beam.

19. A car seat configured to support a child in a vehicle, the car seat including
    a seat bottom, the seat bottom having a continuous wall including an upper seat wall portion, a lower seat wall portion, and a plurality of side seat wall portions, the upper, lower, and side seat wall portions collectively having an interior wall defining an interior seat bottom void; the upper, lower, and side seat wall portions all facing a common first point;
    a seat back coupled to the seat bottom, the seat back having a continuous wall including a front wall portion, a rear wall portion, and a plurality of seat-back side wall portions, the front, rear, and seat-back side wall portions collectively having an interior wall defining an interior seat back void; the front, rear, and seat-back side wall portions all facing a common second point, and
    a harness including shoulder straps positioned to extend over the shoulders of a child positioned in the car seat, at least one strap extending to the seat bottom, and at least one plate joining the at least one strap to the shoulder straps.

20. The car seat of claim 19, wherein the at least one plate includes a pair of plates and the pair of plates abut.

* * * * *